United States Patent [19]

Kossmehl et al.

[11] Patent Number: 4,611,032

[45] Date of Patent: Sep. 9, 1986

[54] OXIDIZING POLYMERIZATION WITH NO$^\oplus$ AND NO$_2^\ominus$

[75] Inventors: Gerhard Kossmehl, Berlin; Jürgen Hocker, Bergisch-Gladbach, both of Fed. Rep. of Germany

[73] Assignee: Georg Chatzitheodorou, Berlin, Fed. Rep. of Germany

[21] Appl. No.: 724,395

[22] Filed: Apr. 18, 1985

Related U.S. Application Data

[63] Continuation of Ser. No. 506,604, Jun. 22, 1983, abandoned.

[30] Foreign Application Priority Data

Jun. 29, 1982 [DE] Fed. Rep. of Germany ....... 3224157
Jun. 29, 1982 [DE] Fed. Rep. of Germany ....... 3224158

[51] Int. Cl.$^4$ ................................................ C08F 8/42
[52] U.S. Cl. .................................. 525/360; 525/326.7; 525/326.8; 525/327.2; 525/367; 525/371; 525/377; 525/410; 528/9
[58] Field of Search ............... 525/360, 367, 371, 377, 525/410; 528/9

[56] References Cited

U.S. PATENT DOCUMENTS 4,452,727 6/1984 Frommer et al. ................... 524/401
4,462,929 7/1984 Shacklette et al. .................. 524/401

*Primary Examiner*—Joseph L. Schofer
*Assistant Examiner*—Bernard Lipman
*Attorney, Agent, or Firm*—Connolly and Hutz

[57] ABSTRACT

Process for the production of doped polymers containing heteroaromatic 5-membered rings in which polymers of aromatic 5-ring membered heterocyclic compounds or low molecular weight compounds containing heterocyclic 5-membered rings are reacted with nitronium or nitrosonium salts, optionally in inert organic solvents, at temperatures of from −20° C. to +80° C. or up to the boiling point of the solvents, and the doped polymers containing heteroaromatic 5-membered rings obtained by this process.

4 Claims, No Drawings

OXIDIZING POLYMERIZATION WITH NO$^\oplus$ AND NO$_2^\ominus$

This is a continuation of Ser. No. 506,604 filed June 22, 1983, now abandoned.

The doping of polyacetylene with nitronium or nitrosonium salts has been carried out and polymers having good conductivity have been obtained. The nitronium and nitrosonium salts used include NO$_2^\oplus$SbF$_6^\ominus$, NO$^\oplus$SbCl$_6^\ominus$ and NO$_2^\oplus$BF$_4^\ominus$ (S. C. Gau, J. A. Milliken, A. Pron, A. G. MacDiarmid, A. J. Heeger, Chem. Comm. 1979, 662; A. G. MacDiarmid, A. J. Heeger, Synthetic Metals 1 (1980) 101).

DE-OS No. 2,929,366 describes the doping of poly(p-phenylene) using, inter alia, NO$^\oplus$SbF$_6^\ominus$, NO$_2^\oplus$SbF$_6^\ominus$, NO$^\oplus$AsF$_6^\ominus$, NO$^\oplus$PF$_6^\ominus$, NO$_2^\oplus$PF$_6^\ominus$, NO$^\oplus$BF$_4^\ominus$, NO$_2^\oplus$BF$_4^\ominus$ and NO$^\oplus$ClO$_4^\ominus$. Polymers having good electrical conductivity are obtained when these substances are used in quantities of from 0.5 to 5%, by weight.

It is also known to convert polyaromatic compounds, such as tetraphenyl or perylene, into substances having high electrical conductivity by means of NO$^\oplus$SbF$_6^\ominus$ (DE-OS No. 3,005,299).

DE-OS No. 3,000,379 and EP No. 35713 and EP No. 39829 describe the doping of polyaromatic compounds and of heteropolyphenylene with nitrosonium and nitronium salts.

The present invention thus relates to the production of doped heterocyclic polymers, wherein polymers of aromatic 5-ring membered heterocyclic compounds or low molecular weight, 5-membered heteroaromatic compounds are reacted with nitronium or nitrosonium salts, and to the polymers obtained by this process. Suitable polymers include those which repeatedly contain in the polymer chain furan, pyrrol, pyrazole, imidazole, thiazole, thiophen or oxazole units.

Polymers which contain repeated thiophendiyl radicals in the chain are particularly preferred.

Polymers which contain sulphur and are suitable for a treatment include the following, for example: poly(2,5-thiophendiyl); poly(2,5-thiophendiyl)sulphide; poly(2,5-thiophendivinylene) and poly(2,5-thiophendiylvinylene-p-phenylene-vinylene).

The following are mentioned as examples of suitable nitronium or nitrosonium salts; NO$^\oplus$SbF$_6^\ominus$; NO$_2^\oplus$SbF$_6^\ominus$; NO$^\oplus$AsF$_6^\ominus$; NO$^\oplus$PF$_6^\ominus$; NO$_2^\oplus$PF$_6^\ominus$; NO$^\oplus$BF$_4^\ominus$ and NO$^\oplus$ClO$_4^\ominus$.

The polymers may be treated with the nitronium or nitrosonium salts at a temperature of from −20° to +80° C. in inert organic solvents. The polymers are frequently not dissolved, but only suspended, and the salts are present as a solution. A quantity of nitronium or nitrosonium salts corresponding to from 10 to 100 % by weight of the polymers to be treated is generally used. This solution is allowed to act on the polymer for some time, up to 20 hours. During the reaction, the polymer changes colour in the direction of black, and the electrical conductivity thereof is greatly improved.

When low molecular weight heteroaromatic compounds having 5-membered rings (including those having two or more heteroaromatic ring systems which may also be part of a conjugated π-electron system) are reacted with nitronium or nitrosonium salts in accordance with the present invention, the end products obtained are not the low molecular weight salts which would be expected, but polymers having a salt structure, due to a combined oxidative polymerisation and doping. Thus, for example, the product obtained from thiophene or 2,2'-bi-thienyl is a polymer having a salt structure which is virtually identical to doped poly(2,5-thiophene diyl).

Examples of suitable heterocyclic compounds having 5-membered rings include thiophene, pyrrole, furan, pyrazole, imidazole, thiazole and oxazole, which compounds may be substituted by halogen, alkyl, carbalkoxy, carbonyl or hydroxyl; further, linked heterocyclic compounds, such as tetrathiafulvalene, di-2- or -3-thienyl sulphide, di-2-thienyl methane and compounds wherein aromatic, substituted aromatic or heteroaromatic ring systems are condensed with 5-membered heterocyclic rings. Doped polymers having good electrical conductivity are obtained in all cases.

The nitronium and nitrosonium salts used for these reactions, such as NO$^\oplus$BF$_4^\ominus$, NO$_2^\oplus$BF$_4^\ominus$, NO$^\oplus$PF$_6^\ominus$, NO$^\oplus$AsF$_6^\ominus$, NO$^\oplus$SbF$_6^\ominus$ or NO$_2^\oplus$SbF$_6^\ominus$, may be provided in either apolar or in polar, absolutely anhydrous solvents, such as hexane, benzene, toluene, dichloromethane, 1,2-dichloro ethane, acetonitrile, nitromethane or mixtures thereof and the reaction may be carried out in either air, nitrogen or argon at temperatures ranging from −20° C. to the boiling point of the solvent used.

Some of these polyheteroaromatic compounds are highly resistant to atmospheric moisture and in some cases also to hydrolysis. Thus, for example, the polymer obtained from thiophene by the action of NO$^\oplus$SbF$_6^\ominus$ (Table 1, No. 7) cannot be hydrolysed to poly(2,5-thiophene diyl) by simply stirring with water at room temperature (Table 1, No. 8), while other polymers may be partly or completely hydrolysed to the corresponding polyheteroarylenes by several hours stirring with water, ethanol or 25% NH$_4$OH at room temperature. When hydrolysis is carried out with NH$_4$OH, it is accompanied by amination (see, for example, Example 6).

The structure of the polymers obtained is confirmed by elemental analysis, IR spectra and mass spectrometric investigations.

The IR spectra of these polymers of salt structure, apart from containing the characteristic bands for the heteroaromatic structural units of the underlying compounds or polymers put into the process, also show the characteristic bands for BF$_4^\ominus$ (1120, 1080, 1030 cm$^{-1}$, very strong; 530, 520 cm$^{-1}$, medium), PF$_6^\ominus$ (1120, 1080 cm$^{-1}$, very strong) and SbF$_6^\ominus$ (1010 cm$^{-1}$, very strong; 470, 450 cm$^{-1}$, medium) (H. Siebert, Anwendungen der Schwingungsspecktroskopie in der anorganischen Chemie, Springer, Berlin 1966; F. Nakamoto, Infrared Spectra of Inorganic and Coordination Compounds, 2nd Ed., Wiley Interscience, New York 1970).

Mass spectrometric investigations (temperature up to 450° C., energy 4 kV) of the polymer obtained from 2,2'-dithienyl by the action of NO$^\oplus$PF$_6^\ominus$ (Table 1, No. 20) showed that the evaporating portion of this polymer contained oligomers having up to 16 thiophene units (molar mass: 1314).

It is particularly this result of mass spectrometric investigation which proves that when low molecular weight compounds having the structures indicated above are reacted with nitronium or nitrosonium salts, oxidative (or dehydrogenating) polymerisation to the polymers of salt structure takes place. The mechanism of this polymerisation would appear to be analogous to that of Kovacic polymerisation of aromatic and heteroaromatic hydrocarbons (M. B. Jones, P. Kovacic, D. Lanska, J. Polymer Sci., Polymer Chem. Ed. 19, (1981), 89; M. B. Jones, P. Kovacic, R. F. Hower, Polymer Preprints 21, 2, (1980), 259; G. G. Engstrom, P. Kovacic, J. Polymer Sci., Polymer Chem. Ed. 15. (1977), 2453), as well as to the mechanism described by G. Kossmehl and G. Chatzitheodorou (Makromol. Chem., Rapid Comm. 2, (1981), 551) for the oxidative (or dehydrogenating) polymerisation of thiophene and 2,2'-bi-thienyl with $AsF_5$.

The experimental particulars for the synthesis of the polymers and the hydrolysis thereof are given in Examples 1 to 7 and the corresponding data in Table 1.

Table 1 also contains the values for electric conductivity ($\delta_{298K}$, $\delta_o$, $E_A$, calculated on the basis of $\delta = \delta_o \cdot \exp(-E_A/2KT)$ for numerous polymers obtained by the process and the hydrolysis products thereof. Measured under standard conditions at a pressure of 1500 kp/cm$^{-2}$ (see. e.g. G. Kossmehl, G. Chatzitheodorou, Makromol. Chem. Rapid Comm. 2 (1981 551), $\delta$-values of up to 0.07 mho.cm$^{-1}$ are obtained when $E_A = 0.04$ eV (Table 1 No. 17).

The polymers according to the present invention may be employed as electrically conductive or semi-conductive structural elements, e.g. in surface heating conductors, in electronic devices, as battery elements, for condensers, for photovoltaic converters and for shielding electromagnetic radiation.

EXAMPLES

EXAMPLE 1

(Table 1, No. 3)

0.84 g (10 mmol) of thiophene are dissolved in 15 ml of absolute acetontrile. A solution of 2.66 g (10 mmol) of $NOSbF_6$ in 300 ml of absolute acetonitrile is introduced drop-wise into the aforesaid solution under a nitrogen atmosphere and with ice cooling. Stirring is continued when the ice bath has thawed. 20 hours later, the black precipitate is suction filtered, thoroughly washed with acetonitrile and dried under a vacuum over $P_2O_5$ and NaOH at room temperature.

Yield: 2.51 g (28% of theoretical yield, calculated as 1:3.5 complex).

$(C_{40}H_{20}S_{10}Sb_{35}F_{210})_m$ Calculated: C 5.30, H 0.22, S 3.53. Observed: C 5.24, H 1.61, S 3,79.

When 10 mmol of thiophene are reacted with 35 mmol of $NOBF_4$, the yield is 98%.

EXAMPLE 2

(Table 1, No. 9)

0.84 g (10 mmol) of thiophene are dissolved in 50 ml of absolute 1,2-dichloroethane. 1.75 g (10 mmol) of $NOPF_6$ in 600 ml of 1,2-dichloroethane are added to this solution under nitrogen and with ice cooling. The black product is worked-up as in Example 1.

Yield: 1.59 g (97% of theoretical yield calculated as 1:0.55 complex).

$(C_{400}H_{200}S_{100}P_{55}F_{330})_m$ Calculated C 29.68, H 1.25, S 19.81. Observed C 29.97, H 1.71, S 19.52.

EXAMPLE 3

(Table 1, No. 17)

1.66 g (10 mmol) of 2,2'-bithienyl are dissolved in 75 ml of absolute 1,2-dichloroethane. 1.17 g (10 mmol) of $NOBF_4$ in 700 ml of $C_2H_4Cl_2$ are added under argon and with ice cooling. The black precipitate is worked-up as in Example 1.

Yield: 1.77 g (55% of theoretical yield calculated as 1:1.8 complex).

$(C_{80}H_{40}S_{20}B_{18}F_{72})_m$ Calculated C 29.98, H 1.26, S 20.01. Observed C 29.82, H 2.09, S 20.55.

When 10 mmol of 2,2'-bithienyl are reacted with 18 mmol of $NOBF_4$, the yield is 99%.

EXAMPLE 4

(Table 1, No. 22)

0.67 g (10 mmol) of pyrrole are dissolved in 15 ml of absolute 1,2-dichloroethane. 1.17 g (10 mmol) of $NOBF_4$ in 250 ml of $C_2H_4Cl_2$ are added under Ar and with ice cooling. The black precipitate is worked-up as in Example 1.

Yield: 1.47 g (90% of theoretical yield, caluated as 1:1.1 complex).

$(C_{40}H_{30}N_{10}B_{11}F_{44})_m$ Calculated: C 29.92, H 1.88, N 8.72. Observed: C 29.65, H 3.30, N 10.06.

When 10 mmol of pyrrole and 11 mmol of $NOBF_4$ are used, the yield rises to 99%.

EXAMPLE 5

(Table 1, No. 27)

0.68 g (10 mmol) of furan are dissolved in 15 ml of absolute dichloroethane. 2.66 g (10 mmol) of $NOSbF_6$ in 300 ml of $C_2H_4Cl_2$ are added under argon and with ice cooling. The black precipitate is worked-up as in Example 1.

Yield: 2.82 g (71% of theoretical yield, calculated as 1:1.4 complex).

$(C_{40}H_{20}O_{10}Sb_{14}F_{84})_m$ Calculated: C 12.13, H 0.51. Observed: C 12.28, H 2.26.

Using 10 mmol of furan and 14 mmol of $NOSbF_6$, the yield rises to 99%.

EXAMPLE 6

(Table 1 No. 36)

1.92 g (10 mmol) of trans-1,2-di(2-thienyl)ethylene are dissolved in 15 ml of absolute acetonitrile. 1.17 g (10 mmol) of $NOBF_4$ in 40 ml of $CH_3CN$ are added under nitrogen and with ice cooling. The black precipitate is worked-up as in Example 1.

Yield: 1.99 g (97% of theoretical yield, calculated as 1:0.15 complex).

$(C_{1000}H_{600}S_{200}B_{15}F_{60})_m$ Calculated: C 59.08, H 2.97, S 31.54. Observed: C 58.91, H 3.41, S 31.25.

EXAMPLE 7

(Table 1, No. 11/12)

The reaction of 1.66 g (10 mmol) of 2,2'-bithienyl with 1.17 g (10 mmol) of $NO^{\oplus}BF_4^{\ominus}$ in 600 ml of hexane results in a black product as described in Example 1.

Yield: 2.27 g (99% of theoretical yield, calculated as 1:0.73 complex).

$(C_{800}H_{400}S_{200}B_{73}F_{292})_m$ Calculated: C 42.22, H 1.77, S 28.17. Observed: C 42.10, H 2.07, S 28.51.

The black product obtained is stirred with 25% $NH_4OH$ at room temperature for 1 hour. The dark brown to black polymer is washed with water until neutral and dehydrated in a vacuum over $P_2O_5$ and NaOH at room temperature.

$(C_4H_2S)_n$ Calculated: C 58.50, H 2.45, S 39.04. Observed: C 52.02, H 2.56, S 39.22, N 2.92.

EXAMPLE 8

(Table 1, No. 41)

0.82 g (10 mmol) of poly(2,5-thiophendiyl) are introduced into 60 ml of absolute dichloromethane. A solution of 2.66 g (10 mmol) of $NOSbF_6$ in 250 ml of $CH_2Cl_2$ is added dropwise into this suspension under $N_2$ and with ice cooling. The dark brown polymer turns black. Once the ice has thawed, the solution heats up to room temperature. 20 hours after the addition of $NOSbF_6$, the black polymer is suction-filtered, thoroughly washed with $CH_2Cl_2$, and dried under vacuum over $P_2O_5$ and NaOH at room temperature.

Yield: 2.18 g (98% of the theoretical yield, expressed as 1/0.6 complex).

$(C_{40}H_{20}S_{10}Sb_6F_{36})_m$ Calculated: C 21.49, H 0.90, S 14.34. Found: C 21.78, H 1.70, S 14.40.

The specific conductivity is $9.1 \times 10^{-5} \Omega^{-1}$ cm$^{-1}$, and activation energy is 0.07 eV.

TABLE 1

Production of polymers of salt structure and electric conductivity thereof

| No. | Starting Product | reacted with | reacted in | under | Yield | $\delta_{298K}$ mho·cm$^{-1}$ | $\delta_o$ mho·cm$^{-1}$ | $E_A$ eV |
|---|---|---|---|---|---|---|---|---|
| 1 | Thiophene | $NO^{\oplus}BF_4^{\ominus}$ | $C_6H_6$ | $N_2$ | 40% | $3.6 \cdot 10^{-9}$ | $3.5 \cdot 10^{-1}$ | 1.18 |
| 2 | Thiophene | $NO^{\oplus}BF_4^{\ominus}$ | $CH_3-CN$ | air | 50% | $7.9 \cdot 10^{-7}$ | $1.2 \cdot 10^{-4}$ | 0.26 |
| 3 | Thiophene | $NO^{\oplus}SbF_6^{\ominus}$ | $CH_3-CN$ | $N_2$ | 98% | $4.0 \cdot 10^{-5}$ | $1.1 \cdot 10^{-3}$ | 0.17 |
| 4 | Thiophene | $NO^{\oplus}BF_4^{\ominus}$ | $CH_2Cl-CH_2Cl$ | $N_2$ | Quant. | $1.5 \cdot 10^{-4}$ | $1.4 \cdot 10^{-3}$ | 0.11 |
| 5 | Thiophene | $NO^{\oplus}BF_4^{\ominus}$ | $CH_2Cl-CH_2Cl$ | Ar | Quant. | $2.4 \cdot 10^{-4}$ | $1.5 \cdot 10^{-2}$ | 0.21 |
| 6 | | from 5 + $NH_4OH^{(b)}$ | | | | $9.2 \cdot 10^{-12}$ | $2.4 \cdot 10^{-5}$ | 0.85 |
| 7 | Thiophene | $NO^{\oplus}SbF_6^{\ominus}$ | $CH_2Cl_2$ | Ar | Quant. | $3.0 \cdot 10^{-5}$ | $2.1 \cdot 10^{-3}$ | 0.22 |
| 8 | | from 7 + $H_2O^{(a)}$ | | | | $1.3 \cdot 10^{-5}$ | $4.3 \cdot 10^{-3}$ | 0.30 |
| 9 | Thiophene | $NO^{\oplus}PF_6^{\ominus}$ | $CH_2Cl-CH_2-Cl$ | $N_2$ | Quant. | $1.7 \cdot 10^{-5}$ | $1.1 \cdot 10^{-3}$ | 0.21 |
| 10 | | from 9 + $C_2H_5OH^{(c)}$ | | | | $8.3 \cdot 10^{-7}$ | $3.3 \cdot 10^{-2}$ | 0.54 |
| 11 | 2.2'-bithienyl | $NO^{\oplus}BF_4^{\ominus}$ | $C_6H_{14}$ | | Quant. | $7.0 \cdot 10^{-3}$ | $4.1 \cdot 10^{-1}$ | 0.21 |
| 12 | | from 11 + $NH_4OH^{(b)}$ | | | | $2.5 \cdot 10^{-10}$ | $3.8 \cdot 10^{-3}$ | 0.85 |
| 13 | 2.2'-bithienyl | $NO^{\oplus}BF_4^{\ominus}$ | $C_6H_6$ | $N_2$ | Quant. | $2.2 \cdot 10^{-3}$ | $2.7 \cdot 10^{-2}$ | 0.13 |
| 14 | 2.2'-bithienyl | $NO^{\oplus}BF_4^{\ominus}$ | $C_6H_5-CH_3$ | $N_2$ | Quant. | $1.7 \cdot 10^{-3}$ | $3.1 \cdot 10^{-2}$ | 0.15 |
| 15 | 2.2'-bithienyl | $NO^{\oplus}BF_4^{\ominus}$ | $CH_3-CN$ | air | 60% | $5.6 \cdot 10^{-4}$ | $1.1 \cdot 10^{-1}$ | 0.27 |
| 16 | 2.2'-bithienyl | $NO^{\oplus}BF_4^{\ominus}$ | $CH_3-CN^{(d)}$ | air | 45% | $1.5 \cdot 10^{-6}$ | $8.5 \cdot 10^{-4}$ | 0.33 |
| 17 | 2.2'-bithienyl | $NO^{\oplus}BF_4^{\ominus}$ | $CH_2Cl-CH_2Cl$ | Ar | Quant. | $6.9 \cdot 10^{-2}$ | $1.4 \cdot 10^{-1}$ | 0.04 |
| 18 | 2.2'-bithienyl | $NO^{\oplus}SbF_6^{\ominus}$ | $CH_2Cl_2$ | Ar | Quant. | $4.1 \cdot 10^{-2}$ | $2.1 \cdot 10$ | 0.20 |
| 19 | | from 17 + $H_2O^{(a)}$ | | | | $4.6 \cdot 10^{-4}$ | $1.6 \cdot 10^{+12}$ | 1.84 |
| 20 | 2.2'-bithienyl | $NO^{\oplus}PF_6^{\ominus}$ | $CH_2Cl-CH_2Cl$ | $N_2$ | Quant. | $7.1 \cdot 10^{-5}$ | $5.8 \cdot 10^{-4}$ | 0.11 |
| 21 | Pyrrole | $NO^{\oplus}BF_4^{\ominus}$ | $CH_3-CN$ | air | 55% | $7.8 \cdot 10^{-10}$ | $5.8 \cdot 10^{-3}$ | 0.81 |
| 22 | Pyrrole | $NO^{\oplus}BF_4^{\ominus}$ | $CH_2Cl-CH_2Cl$ | Ar | Quant. | $7.4 \cdot 10^{-3}$ | $6.3 \cdot 10^{-2}$ | 0.11 |
| 23 | Pyrrole | $NO^{\oplus}SbF_6^{\ominus}$ | $CH_2Cl_2$ | Ar | Quant. | $1.1 \cdot 10^{-7}$ | $2.9 \cdot 10^{-4}$ | 0.41 |
| 24 | | from 23 + $H_2O^{(a)}$ | | | | $5.4 \cdot 10^{-11}$ | $1.8 \cdot 10^{+7}$ | 2.07 |
| 25 | Pyrrole | $NO^{\oplus}PF_6^{\ominus}$ | $CH_2Cl-CH_2Cl$ | $N_2$ | Quant. | $4.0 \cdot 10^{-8}$ | $5.7 \cdot 10^{-5}$ | 0.37 |
| 26 | | from 25 + $C_2H_5OH^{(c)}$ | | | | $3.1 \cdot 10^{-9}$ | $2.2 \cdot 10^{+4}$ | 1.52 |
| 27 | Furan | $NO^{\oplus}BF_4^{\ominus}$ | $CH_2Cl-CH_2Cl$ | $N_2$ | Quant. | $7.0 \cdot 10^{-6}$ | $1.9 \cdot 10^{+5}$ | 1.23 |
| 28 | Furan | $NO^{\oplus}SbF_6^{\ominus}$ | $CH_2Cl_2$ | Ar | Quant. | $2.2 \cdot 10^{-6}$ | $3.4 \cdot 10^{-5}$ | 0.14 |
| 29 | | from 28 + $H_2O^{(a)}$ | | | | $1.1 \cdot 10^{-13}$ | $1.2 \cdot 10^{-5}$ | 0.95 |
| 30 | Furan | $NO^{\oplus}PF_6^{\ominus}$ | $CH_2Cl-CH_2Cl$ | $N_2$ | Quant. | $3.0 \cdot 10^{-7}$ | $1.1 \cdot 10^{-6}$ | 0.07 |
| 31 | | from 30 + $C_2H_5.OH^{(c)}$ | | | | $1.1 \cdot 10^{-14}$ | $1.8 \cdot 10^{-4}$ | 1.21 |
| 32 | Pyridine | $NO_2^{\oplus}SbF_6^{\ominus}$ | $CH_2Cl_2$ | Ar | 40% | $7.4 \cdot 10^{-10}$ | $4.9 \cdot 10^{-7}$ | 0.33 |
| 33 | Tetrathiafulvalene | $NO^{\oplus}BF_4^{\ominus}$ | $CH_2Cl-CH_2Cl$ | $N_2$ | 45% | $2.0 \cdot 10^{-8}$ | $4.9 \cdot 10^{-2}$ | 0.76 |
| 34 | 3,3'-dithienyl sulphide | $NO^{\oplus}BF_4^{\ominus}$ | $CH_2Cl-CH_2Cl$ | $N_2$ | 70% | $6.6 \cdot 10^{-13}$ | $3.5 \cdot 10^{-5}$ | 0.91 |
| 35 | 1,2-di-2-thienyl ethylene | $NO^{\oplus}BF_4^{\ominus}$ | Hexane | $N_2$ | Quant. | $1.7 \cdot 10^{-6}$ | $9.4 \cdot 10^{+1}$ | 0.92 |
| 36 | 1,2-di-2-thienyl ethylene | $NO^{\oplus}BF_4^{\ominus}$ | $CH_3-CN$ | $N_2$ | Quant. | $3.0 \cdot 10^{-6}$ | $7.8 \cdot 10^{-3}$ | 0.40 |
| 37 | N—methyl-pyrrole | $NO^{\oplus}PF_6^{\ominus}$ | $CH_3CN$ | $N_2$ | 66% | $6.2 \cdot 10^{-8}$ | — | — |
| 38 | Furfuryl-alcohol | $NO^{\oplus}PF_6^{\ominus}$ | $CH_3CN$ | $N_2$ | 48% | $3.4 \cdot 10^{-6}$ | — | — |
| 39 | 3-methyl-thiophene | $NO^{\oplus}PF_6^{\ominus}$ | $CH_3CN$ | $N_2$ | 72% | $4.3 \cdot 10^{-7}$ | — | — |
| 40 | 2-methyl-thiazole | $NO^{\oplus}BF_4^{\ominus}$ | $CH_2Cl_2$ | $N_2$ | 68% | $7.3 \cdot 10^{-6}$ | — | — |
| 41 | Poly(2,5-thiophendiyl) | $NOSbF_6$ | $CH_2Cl_2$ | $N_2$ | 98% | $9.1 \cdot 10^{-5}$ | — | — |

$(a)$Stirring with water for 1 hour at room temperature.
$(b)$Hydrolysis with 25% $NH_4OH$, stirring 1 hour at room temperature.
$(c)$Stirring for 3 hours with ethanol at room temperature.
$(d)$Reaction in boiling $CH_3-CN$.

We claim:

1. Process for the production of doped polymers which comprises reacting polymers consisting essentially of repeating units of 5-atom aromatic rings containing a nitrogen, sulfur or oxygen hetero-atom at −20° C. to 80° C. with a nitronium or nitrosonium salt selected from the group consisting of $NO^{\oplus}BF_4^{\ominus}$, $NO_2^{\oplus}BF_4^{\ominus}$, $NO^{\oplus}PF_6^{\ominus}$, $NO_2^{\oplus}PF_6^{\ominus}$, $NO^{\oplus}SbF_6^{\ominus}$ or $NO^{\oplus}AsF_6^{\ominus}$, $NO_2^{\oplus}AsF_6^{\ominus}$, $NO_2^{\oplus}SbF_6^{\ominus}$, $NO^{\oplus}ClO_4^{\ominus}$ and $NO_2^{\oplus}ClO_4^{\ominus}$.

2. Process according to claim 1 wherein the reaction is in the presence of an inert organic solvent.

3. Process according to claim 1 wherein the amount of nitronium or nitrosonium salt is from 10 to 100% by weight of the polymer.

4. Process according to claim 1 wherein the polymer reacted consists essentially of repeating thiophendiyl moieties.

* * * * *